United States Patent [19]

Reyes et al.

[11] Patent Number: 5,673,420
[45] Date of Patent: Sep. 30, 1997

[54] METHOD OF GENERATING POWER VECTORS FOR CELL POWER DISSIPATION SIMULATION

[75] Inventors: Alberto J. Reyes, Phoenix; Gary K. Yeap, Gilbert; James P. Garvey, Chandler, all of Ariz.

[73] Assignee: Motorola, Inc., Schaumburg, Ill.

[21] Appl. No.: 702,852

[22] Filed: Aug. 26, 1996

Related U.S. Application Data

[63] Continuation-in-part of Ser. No. 254,831, Jun. 6, 1994, abandoned.

[51] Int. Cl.$^6$ .................................................. G06F 17/50
[52] U.S. Cl. ........................... 395/500; 364/489; 364/490; 364/578
[58] Field of Search ...................... 364/488, 489, 364/490, 578; 395/500

[56] References Cited

U.S. PATENT DOCUMENTS

| | | | |
|---|---|---|---|
| 4,621,339 | 11/1986 | Wagner et al. | 364/489 |
| 5,384,720 | 1/1995 | Ku et al. | 364/488 |
| 5,392,227 | 2/1995 | Hiserote | 364/490 |
| 5,394,346 | 2/1995 | Milsom | 364/489 |
| 5,406,497 | 4/1995 | Altheimer et al. | 364/489 |

OTHER PUBLICATIONS

Devadas et al., "Estimation of Power Dissipation in CMOS Combinational Circuits Using Boolean Function Manipulation",IEEE Trans on CAD, vol. 11, No. 3, Mar. 1992 pp. 373–383.

Devadas et al, "Boolean Minimization & Algebraic Factorization Procedures for fully Testable Sequential Machines", IEEE, 1989.

Devadas et al., "Boolean Decomposition in Multi–Level Logic Optimization", IEEE, 1988.

Devadas et al., "Exact Algorithms for Output Encoding, State Assignment, and Four–Level Boolean Minimization", IEEE Trans on CAD, vol. 10, No. 1, Jan. 1991, pp. 13–27.

Perkins et al., "An Algorithm for Identifying and Selecting the Prime Implicants of a Multiple–Output Boolean Function", IEEE Trans on CAD, vol. 7, No. 11, Nov. 1988, pp. 1215–1218.

Devadas, "Minimization of Functions with Multiple–Valued Outputs: Theory & Appl." IEEE pp. 308–315.

Devadas et al., "Estimation of Power Dissipation in CMOS Combinational Circuits", IEEE Custom IC Conf 1990, pp. 19.7.1–19.7.6.

*Primary Examiner*—Kevin J. Teska
*Assistant Examiner*—Tyrone V. Walker
*Attorney, Agent, or Firm*—Robert D. Atkins; Rennie William Dover

[57] ABSTRACT

A method of generating power vectors to calculate power dissipation for a circuit cell is provided. The method involves formulating the Boolean equations (30) that describe the logical operation for a circuit cell (10). Primitive power vectors that cause an output to transition are generated (32) using Boolean difference functions. Internal power vectors that cause an internal node to transition without transitioning the output are generated (34) using Boolean difference functions. Static power vectors with all possible steady state inputs are also generated (36). The power vectors are minimized (38) to eliminate redundant vectors. The resulting power vectors can be used in a circuit simulation in evaluating (40) the power dissipation of a designed logic circuit.

14 Claims, 4 Drawing Sheets

METHOD OF GENERATING POWER VECTORS FOR CELL POWER DISSIPATION SIMULATION

This application is a continuation-in-part of prior application Ser. No. 08/254,831, filed Jun. 6, 1994, now abandoned.

BACKGROUND OF THE INVENTION

The present invention relates in general to automated integrated circuit design and, more particularly, to a method of simulating power dissipation in an integrated circuit.

Advances in semiconductor technology have made commonplace the manufacture of high capacity, high density integrated circuits (ICs) in the range of a million or more transistors. Digital circuits such as microprocessors are examples of such high capacity, high density ICs. Power consumption and heat dissipation become major concerns in circuits with such a large number of transistors. In order to deal with the heat dissipation problem circuit designers continually look for more efficient ways to calculate an accurate estimate of the power consumption and adjust the design if necessary before the circuit is committed to manufacturing.

In the past, much of the effort in obtaining the estimated power consumption of the IC has been done by computer simulations. SPICE circuit simulations are one example of such computer modeling. While SPICE simulation is accurate, it is also very time consuming. In order to set up a SPICE simulation, the designer must develop a transistor level netlist, ascertain the necessary input vectors, and determine the proper SPICE model for the elements in the netlist.

The predetermined set of input vectors are applied to inputs of the IC while it is monitored for power consumption. One technique involves measuring the supply current sourced from the power supply conductors that power the IC. The measured supply current from a known voltage source over a known period of time provides a measure of power consumption. The set of input signal vectors often becomes quite extensive to properly exercise the circuit. Moreover, many of the input signal vectors redundantly exercise components within the overall design, thereby adding to the simulation time. It is not uncommon for more complex simulations to take days to complete. Thus, many automated circuit simulators are limited to small circuit modeling because of the time consuming aspect of the task.

Hence, a need exists to accurately and rapidly estimate power consumption in an IC using a minimal set of input vectors.

DETAILED DESCRIPTION OF THE PREFERRED EMBODIMENT

Power dissipation in CMOS logic circuits is principally due to three main components; (1) charging and discharging of capacitive loads, (2) short circuit current, and (3) leakage current. The majority of power dissipation is attributable to the first two components and commonly referred to as dynamic power dissipation. The power dissipation is caused by signal transitions occurring at the input and output terminals and internal nodes of the logic gates that comprise the digital circuit. A smaller fraction of power consumption, referred to as static power dissipation, is due to leakage current under static logic states. Both dynamic and static power dissipation can be measured by simulating the digital circuit and making power measurements. The simulation is typically performed by applying an appropriate set of input logic vectors that cause power dissipation, called power vectors, to the input terminals of the digital circuit. For example, (0, 1, r) is a power vector where the first input is at logic zero, the second input is at logic one and the third input switches from 0 to 1 (denoted by symbol "r" for rising). The present invention considers power vectors in which only one input signal changes state at a given time while the other inputs remain fixed. Once a circuit design having a suitable power dissipation is obtained, the circuit design is stored in a computer-readable medium. Then the circuit design having the suitable power dissipation is used to implement the layout of the circuit and a set of photomasks are generated in accordance with the circuit layout.

Figure 1:
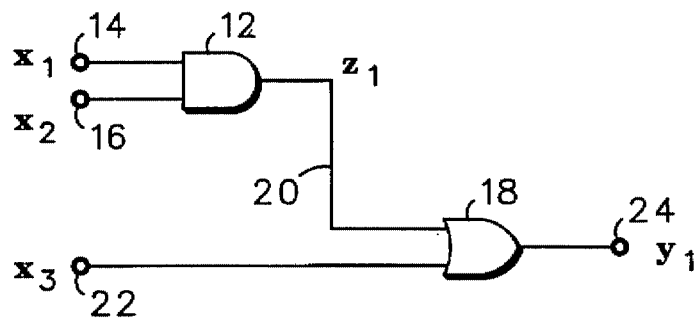
FIG. 1 is a block diagram illustrating a circuit cell for simulating power consumption.

FIG. 1 illustrates a simple logic cell 10 useful in demonstrating the process of generating the power vectors that dissipate power in accordance with the present invention. Logic cell 10 comprises AND gate 12 receiving first and second input signals at terminals 14 and 16. OR gate 18 receives the output signal from AND gate 12 at internal node 20 and a third input signal from terminal 22. The output of logic cell 10 is terminal 24.

One part of the present invention determines a minimal number of power vectors that allows for complete measurements of power dissipation in the cell. Once the minimal set of power vectors is determined, one technique involves measuring the supply current sourced from the power supply conductors that power the cell. The measured supply current from a known voltage source over a known period of time provides a measure of power consumption. A computer system executing simulation software performs the power dissipation estimation using the power vectors determined by the present invention.

Figure 2:
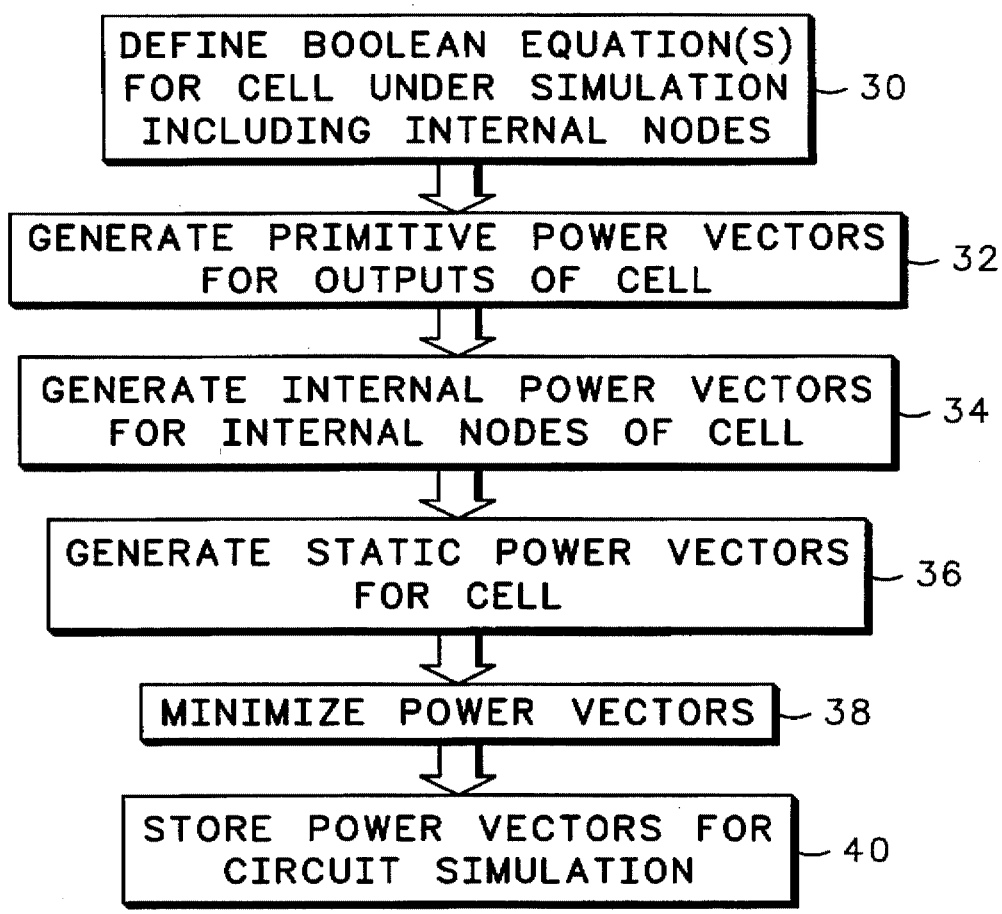
FIG. 2 illustrates steps of generating a complete minimal set of power vectors to measure power consumption.

FIG. 2 illustrates process steps performed, for example in computer software, to generate a minimal yet complete and error-free set of power vectors in order to simulate the power dissipation of cell 10. Step 30 defines the Boolean equation that describes the logical operation of the cell under simulation, e.g. logic cell 10. The Boolean algebraic expression for logic cell 10 is $z_1=x_1 \cdot x_2$; and $y_1=z_1+x_3$, where $x_1$, $x_2$, and $x_3$ are signals at nodes 14, 16 and 22, respectively. The signals at internal node 20 and output terminal 24 are denoted as $z_1$ and $y_1$, respectively. A more complex cell may include a number of individual Boolean equations describing an interrelated series of sub-functions that in the aggregate describe the overall operation of the cell. The Boolean equation(s) must include all intermediate signals corresponding to internal nodes, e.g. $z_1$ at node 20 in FIG. 1, that may transition and therefore consume power but are not readily detectable from any input or output terminal of the cell.

Step 32 generates primitive power vectors for cell 10 that cause power consumption at the output terminals as the output signals of the cell change state. Simple cells such as AND gates, OR gates, and inverters have dynamic power dissipation, i.e. total power consumption detectable at the output terminals, that can be completely exercised by the set of primitive power vectors. The primitive power vectors are a subset of the total power vector set that is used to measure power consumption of cell 10. Step 32 is described in more detail in FIG. 3.

More complex cells experience power dissipation at internal nodes that change logic state in response to the power vectors. Some internal node activity does not necessarily result in an output transition and therefore may be undetected at the output terminal of the cell. For example, assuming $x_1$, $x_2$, and $x_3$ are each logic one, then $y_1$ is also logic one. If $x_1$ changes state to logic zero, $z_1$ changes to logic zero, but $y_1$ remains at logic one because of the "OR" operation. Therefore, primitive power vectors as described above do not account for power dissipation attributed to internal nodal activity that does not result in transitions at the output terminals of the cell. More complex cells generally require internal power vectors to exercise internal nodes. Step 34 generates internal power vectors that exercise internal nodes in the cell without that activity being observed at the output terminals. The internal power vectors and the primitive power vectors give a complete set of vectors for the dynamic power dissipation of any cell. Step 34 is described in more detail in FIG. 4.

Step 36 generates static power vectors for the cell that cause static power dissipation. The static power vectors do not change state and include all possible input steady states of the cell, i.e. all possible input binary combinations. For example, logic cell 10 in FIG. 1 has eight combinations for terminals 14, 16 and 22 sequentially running from (0,0,0), (0,0,1), (0,1,0), (0,1,1), (1,0,0), (1,0,1), (1,1,0), and (1,1,1).

The combination of primitive power vectors, internal power vectors, and static power vectors comprise the total set of power vectors that are used to measure power consumption in cell 10. Step 38 minimizes the total set of vectors to ensure the set is complete, minimal, and non-redundant. Step 38 is described in more detail in FIG. 5.

Steps 30–38 have defined the Boolean equation for logic cell 10 and identified the minimal number of primitive, internal and static power vectors necessary to simulate power consumption. Step 40 involves storing the power vector set in a database for later use in a circuit power dissipation simulation. When a designer selects logic cell 10 for use in a particular IC design, the Boolean equation and minimal number of primitive, internal and static power vectors are retrieved from the database to simulate power consumption for the cell in the IC.

Figure 3:
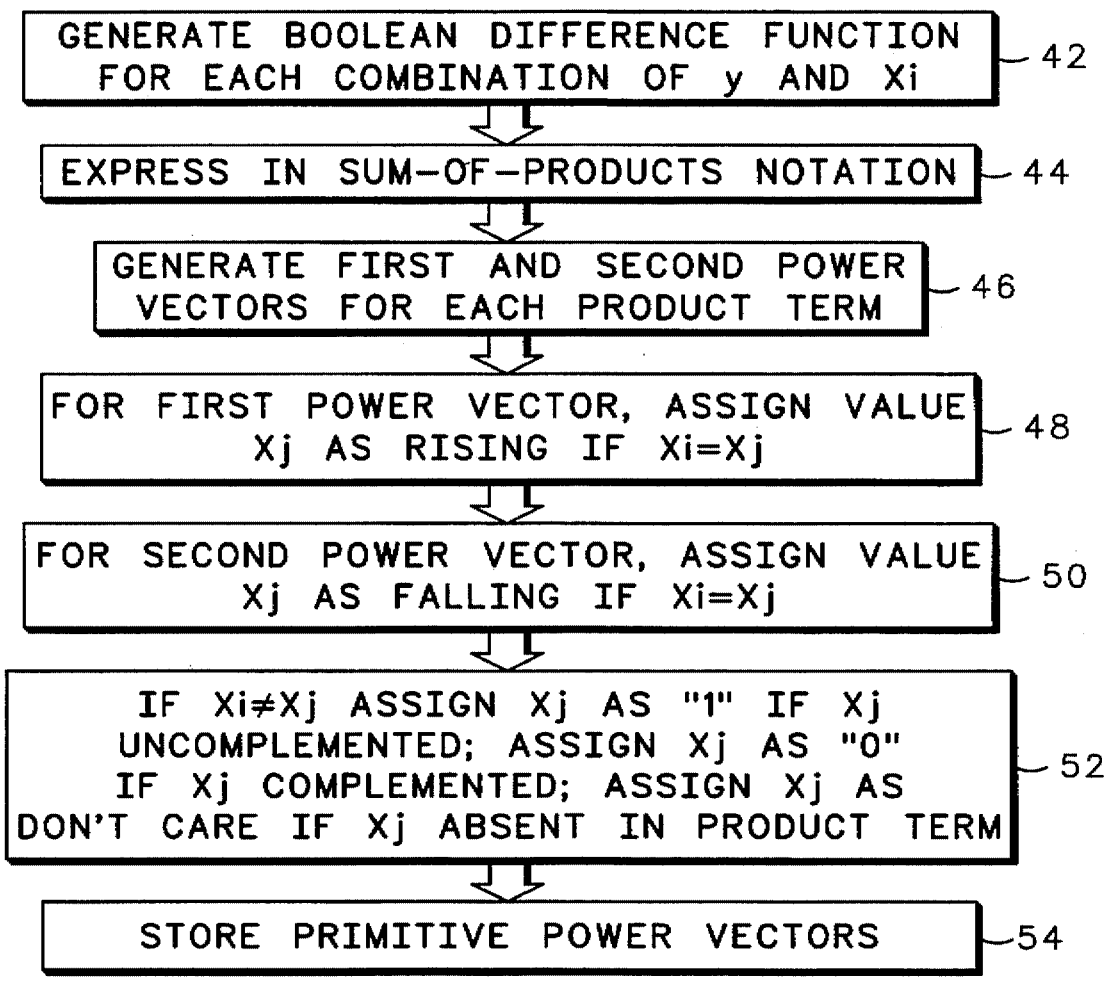
FIG. 3 illustrates steps of generating primitive power vectors for external outputs.

Turning to FIG. 3, the steps of generating primitive power vectors are shown. A primitive power vector is a power vector which has one input transition that causes a change in the output state of the cell. The primitive power vectors can be obtained from the logic function of the cell using Boolean Difference Calculus. Let the logic function computed by a simple single output combinational cell be given by $y=F(x_1, x_2, \ldots, x_n)$, where $x_1, x_2, \ldots, x_n$ are input elements. The Boolean difference of y with respect to an input variable $x_i$, denoted as $Bool\_diff(y,x_i)$, results in a new Boolean function and is defined as the exclusive-OR ($\oplus$) of the function y with $x_i$ set to 0 and the function y with $x_i$ set to 1. Consider $y=f(x_1, \ldots, x_{i-1}, x_i, x_{i+1}, \ldots, x_n)$ as follows:

$$Bool\_diff(y,x_i)=f(x_1,\ldots,x_{i-1},0,x_{i+1},\ldots,x_n) \oplus f(x_1,\ldots,x_{i-1},1,x_{i+1},\ldots,x_n) \quad (1)$$

If for example $y=x_1 \cdot x_2$, then $$Bool\_diff(y,x_1) = (0 \cdot x_2) \oplus (1 \cdot x_2) \quad (2)$$
$$= 0 \oplus x_2 = x_2$$

$$Bool\_diff(y,x_2) = (x_1 \cdot 0) \oplus (x_1 \cdot 1) \quad (3)$$
$$= 0 \oplus x_1 = x_1$$

Note that the $Bool\_diff(y,x_i)$ is another Boolean function that does not include the variable $x_i$, and hence the $Bool\_diff(y,x_i)$ is independent of the variable $x_i$. The Boolean difference of an output y with respect to $x_i$ gives crucial information regarding the transition propagation characteristics of input $x_i$ to the output y.

Let P be a power vector where only input signal $x_i$ switches. From the Boolean function(s) that describe the cell, $Bool\_diff(y,x_i)$ provides a new Boolean function as described above in equation (1). The power vector P is substituted into and evaluated by $Bool\_diff(y,x_i)$ for the logic values of the variables $x_1, \ldots, x_n$, excluding $x_i$ since $Bool\_diff(y,x_i)$ is independent of the variable $x_i$, to yield a function denoted as $Bool\_diff(y,x_i)(P)$. Since power vector P has only one input switching, i.e. other inputs are fixed as logic zero or logic one, and that input is independent of $Bool\_diff(y,x_i)$, then $Bool\_diff(y,x_i)(P)$ must necessarily evaluate to a logic zero or logic one.

For example, when $y=x_1 \cdot x_2$, $Bool\_diff(y, x_1)=x_2$ as demonstrated above in equation (2). By substituting a given value of $P=(x_1=r,x_2=1)$, $Bool\_diff(y,x_1)(P)=1$ since $Bool\_diff(y,x_1)$ is a function only of $x_2$. Alternately if $P=(x_1=r, x_2=0)$, then $Bool\_diff(y,x_1)(P)=0$ again due to the fact that $Bool\_diff(y,x_1)$ is a function only of $x_2$.

When $Bool\_diff(y,x_i)(P)=1$, it can be shown mathematically that the transition of power vector P at $x_i$ propagates to the output y. When $Bool\_diff(y,x_i)(P)=0$, the transition of power vector P does not propagate to output y. From these properties, the primitive power vectors for a cell implementing the function y can now be obtained. The primitive power vectors for an input $x_i$ switching are the power vectors P for which $Bool\_diff(y,x_i)(P)=1$. All power vectors P that result in $Bool\_diff(y,x_i)(P)=1$ is the desired set of primitive power vectors. The internal power vectors for an input $x_i$ switching are the power vectors P for which $Bool\_diff(y,x_i)(P)=0$. All power vectors P that result in $Bool\_diff(y,x_i)(P)=0$ is the desired set of internal power vectors.

To determine all primitive power vectors P that result in $Bool\_diff(y,x_i)(P)=1$, step 42 in FIG. 3 generates a function $Bool\_diff(y,x_i)$ for each combination of y and $x_i$ from the Boolean equation that describes the cell. The resulting $Bool\_diff(y,x_i)$ function is expressed as sum-of-product terms in step 44. Using FIG. 1 as an example, the Boolean equation for cell 10 is $y_1=(x_1 \cdot x_2)+x_3$.

$$Bool\_diff(y_1,x_1) = \{(1 \cdot x_2)+x_3\} \oplus \{(0 \cdot x_2)+x_3\} \quad (4)$$
$$= x_2+x_3 \oplus x_3$$
$$= x_2 \cdot \overline{x_3}$$

$$Bool\_diff(y_1,x_2) = \{(x_1 \cdot 1)+x_3\} \oplus \{(x_1 \cdot 0)+x_3\} \quad (5)$$
$$= x_1+x_3 \oplus x_3$$
$$= x_1 \cdot \overline{x_3}$$

$$Bool\_diff(y_1,x_3) = \{(x_1 \cdot x_2)+1\} \oplus \{(x_1 \cdot x_2)+0\} \quad (6)$$
$$= 1 \oplus x_1 \cdot x_2$$
$$= \overline{x_1}+\overline{x_2}$$

For each product term in equations (4), (5), and (6), step 46 produces two power vectors $(x_1,x_2,\ldots,x_j,\ldots,x_n)$ as follows. If $x_j=x_i$, step 48 assigns the value of the variable $x_j$ as "r" (rising "0" to "1" transition) for the first vector while step 50 assigns the value of the variable $x_j$ as "f" (falling "1" to "0" transition) for the second vector. If $x_j \neq x_i$ ($x_j$ not equal to $x_i$) and $x_j$ appears uncomplemented in the product term, then $x_j$ is logic one for the first and second vectors as provided in step 52. If $x_j \neq x_i$ and $x_j$ appears complemented in the product term, then $x_j$ is logic zero for the first and second vectors, or if $x_j$ is absent in the product term, then $x_j$ is assigned as "x" (don't care) for the first and second vectors in step 52.

The first primitive power vector from equation (4) is (r,1,0) with $x_i = x_1$ and $x_j$ taking on values $x_1$, $x_2$, and $x_3$ in steps 48–52. The $x_1$ value is "r" because $x_j = x_i$ in the first primitive power vector as per step 48. The $x_2$ value is "1" because $x_j = x_1$ and $x_j$ appears uncomplemented in the product term as per step 52. The $x_3$ value is "0" because $x_j \neq x_i$ and $x_j$ appears complemented in the product term as per step 52. Similarly, the second primitive power vector from equation (4) is (f,1,0) with $x_i = x_1$ and $x_j$ assuming values of $x_1$, $x_2$, and $x_3$ as in steps 50–52.

The first primitive power vector from equation (5) is (1,r,0) with $x_i = x_2$ and $x_j$ taking on values $x_1$, $x_2$, and $x_3$. Likewise, the second primitive power vector from equation (5) is (1,f,0) with $x_i = x_2$ and $x_j$ incrementing from $x_1$ to $x_3$. In equation (6), the first primitive power vector for the first product term $\overline{x_1}$ is (0,x,r) with $x_i = x_3$ and $x_j$ stepping through values $x_1$, $x_2$, and $x_3$. The second primitive power vector for the first product term $\overline{x_1}$ is (0,x,f) with $x_i = x_3$ and $x_j$ incrementing from $x_1$ to $x_3$. Continuing with equation (6), the first primitive power vector for the second product term $\overline{x_2}$ is (x,0,r) with $x_i = x_3$ and $x_j$ going from $x_1$ to $x_3$. The second primitive power vector for the second product term $\overline{x_2}$ is (x,0,f) with $x_i = x_3$ and $x_j$ stepping through values $x_1$, $x_2$, and $x_3$.

In summary, the primitive power vectors for cell 10 are (r,1,0), (f,1,0), (1,r,0), (1,f,0), (0,x,r), (0,x,f), (x,0,r), and (x,0,f). Step 54 stores the primitive power vectors for later use in step 38. Steps 42–52 are repeated for any other output nodes.

Figure 4:
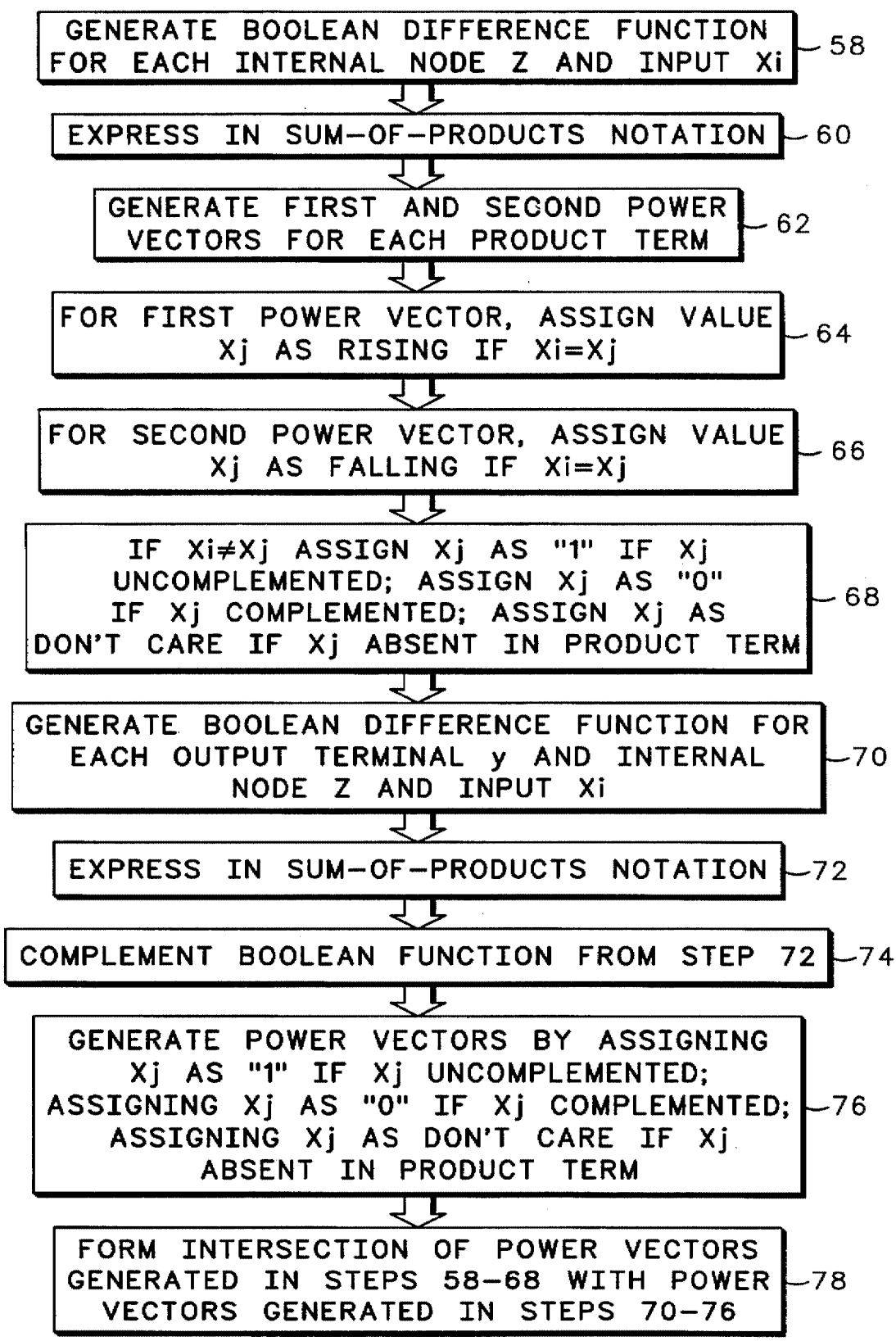
FIG. 4 illustrates steps of generating internal power vectors for internal nodes.

FIG. 4 illustrates the steps in generating internal power vectors. It can happen that some power vectors cannot be observed at a cell output due to the signal encountering a blocked logical path. Yet, if such a power vector produces a transition at some internal node in the cell some dynamic power is still dissipated that needs to be accounted for in the overall simulation. Power dissipation at internal nodes becomes more prevalent in larger cells. Internal power vectors are generated in the present invention to include power dissipated at internal nodes that do not cause an output transition.

Let $z_1$ be the signal at internal node 20 in cell 10. Let the logic function of $z_1 = f1(x_1, x_2, \ldots, x_n)$, the output function of the cell is $y_1 = f2(z_1, x_1, x_2, \ldots, x_n)$. To determine all internal power vectors P that result in Bool_diff$(y,x_i)(P) = 0$, i.e. internal node transition does not cause the output to transition, step 58 in FIG. 4 generates a function Bool_diff $(z_1, x_i)$ for each internal node $z$ and input $x_i$ from the Boolean equation that describes signal processing to that node. The resulting Bool_diff$(z,x_i)$ function is expressed as sum-of-product terms in step 60. Using FIG. 1 as an example, the Boolean equation up to node 20 is $z_1 = x_1 \cdot x_2$.

$$Bool\_diff(z_1,x_1) = (1 \cdot x_2) \oplus (0 \cdot x_2) \qquad (7)$$
$$= x_2$$

$$Bool\_diff(z_1,x_2) = (x_1 \cdot 1) \oplus (x_1 \cdot 0) \qquad (8)$$
$$= x_1$$

For each product term in equations (7) and (8), step 62 produces two power vectors $(x_1, x_2, \ldots, x_j, \ldots, x_n)$ using the same rules described in steps 48–52 of FIG. 3. If $x_j = x_i$, step 64 assigns the value of the variable $x_j$ as "r" (rising "0" to "1" transition) for the first vector while step 66 assigns the value of the variable $x_j$ as "f" (falling "1" to "0" transition) for the second vector. If $x_j \neq x_i$ and $x_j$ appears uncomplemented in the product term, then $x_j$ is logic one for the first and second vectors as provided in step 68. If $x_j \neq x_i$ and $x_j$ appears complemented in the product term, then $x_j$ is logic zero for the first and second vectors. If $x_j$ does not appear in the product term, then $x_j$ is assigned as "x" (don't care) for the first and second vectors in step 68.

The first power vector from equation (7) is (r,1,x) with $x_i = x_1$ and $x_j$ incrementing from $x_1$ to $x_3$ in steps 64–68. The $x_1$ value is "r" because $x_j = x_i$ in the first power vector as per step 64. The $x_2$ value is "1" because $x_j = x_i$ and $x_j$ appears uncomplemented in the product term as per step 68. The $x_3$ value is "x" because $x_j \neq x_i$ and $x_3$ does not appear in equation (7). Similarly, the second power vector from equation (7) is (f,1,x) with $x_i = x_1$ and $x_j$ assuming values of $x_1$, $x_2$, and $x_3$ as in step 64.

The first power vector from equation (8) is (1,r,x) with $x_i = x_2$ and $x_j$ cycling through values of $x_1$, $x_2$, and $x_3$. Likewise, the second primitive power vector from equation (8) is (1,f,x) with $x_i = x_2$ and $x_j$ assuming values of $x_1$, $x_2$, and $x_3$. Therefore, the set of power vectors from steps 64–68 is (r,1,x), (f,1,x), (1,r,x), and (1,f,x). Steps 64–68 are repeated for any other internal nodes.

Next, another Boolean difference function is formed as Bool_diff$(y_1,z_1)$ in step 70 according to equation (9). The Boolean equation from node 20 to output terminal 24 is $y_1 = z_1 + x_3$. Step 72 expresses the Bool_diff$(y_1,z_1)$ in sum-of-products notation. Step 74 complements Bool_diff$(y_1,z_1)$ as provided in equation (10).

$$Bool\_diff(y_1,z_1) = (1+x_3) \oplus (0+x_3) \qquad (9)$$
$$= x_3$$

$$\overline{Bool\_diff(y_1,z_1)} = x_3 \qquad (10)$$

Step 76 provides the rules to generate the power vector (x,x,1) from equation (10) similar to step 68. The terms $x_1$ and $x_2$ are don't care because neither appears in equation (10). The term $x_3$ is logic one because $\overline{Bool\_diff(y_1,z_1)} = x_3$ is uncomplemented.

In step 78, the internal power vectors for cell 10 is the intersection ($\cap$) of power vector(s) from steps 58–68 with the power vector(s) from steps 70–76. The intersection is performed element by element for each combination of power vectors from steps 58–68 and from steps 70–76. If steps 58–68 generate "m" power vectors and steps 70–76 generate "n" power vectors, then the intersection would produce at most "m" times "n" internal power vectors. For the present example, the internal power vectors are (r,1,x) $\cap$ (x,x,1)=(r,1,1); (f,1,x) $\cap$ (x,x,1)=(f,1,1); (1,r,x) $\cap$ (x,x,1)= (1,r,1); and (1,f,x) $\cap$ (x,x,1)=(1,f,1).

Figure 5:
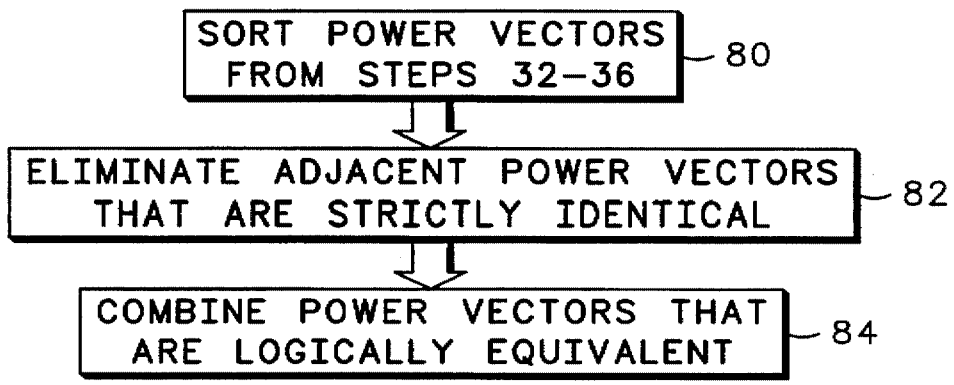
FIG. 5 illustrates steps minimizing of the number of power vectors.

Turning to FIG. 5, a minimization process is shown to minimize the number of power vectors by eliminating and/or combining redundant ones. The power vectors derived from steps 32, 34 and 36 of FIG. 2 are first sorted in step 80. The sorting process places identical power vectors adjacent to one another for easy comparison. Identical adjacent power vectors are eliminated in step 82 by comparing neighboring vectors. Logically equivalent power vectors, i.e. ones including don't care elements, can be merged using classical Boolean containment rules for individual input variables in step 84. For example, consider two power vectors $P_1$ and $P_2$ consisting of three input variables with $P_1=(r,1,x)$ and $P_2=(r,1,0)$. The third input variable in $P_1$ is don't care and therefore is logically identical to $P_2$. Hence, power vector $P_1$ merges with $P_2$ to produce a single vector $(r,1,0)$.

The minimal set of power vectors for each cell are stored in a computer-readable storage medium. Once power vectors are generated for each cell, the power vectors can be used to simulate a cell and obtain measurements on power dissipation for a wide variety of possible operating conditions. The resulting power measurements are stored in a computer-readable storage medium with the corresponding vector to provide a power dissipation number associated with a particular input to a cell under a particular operating condition.

Figure 6:
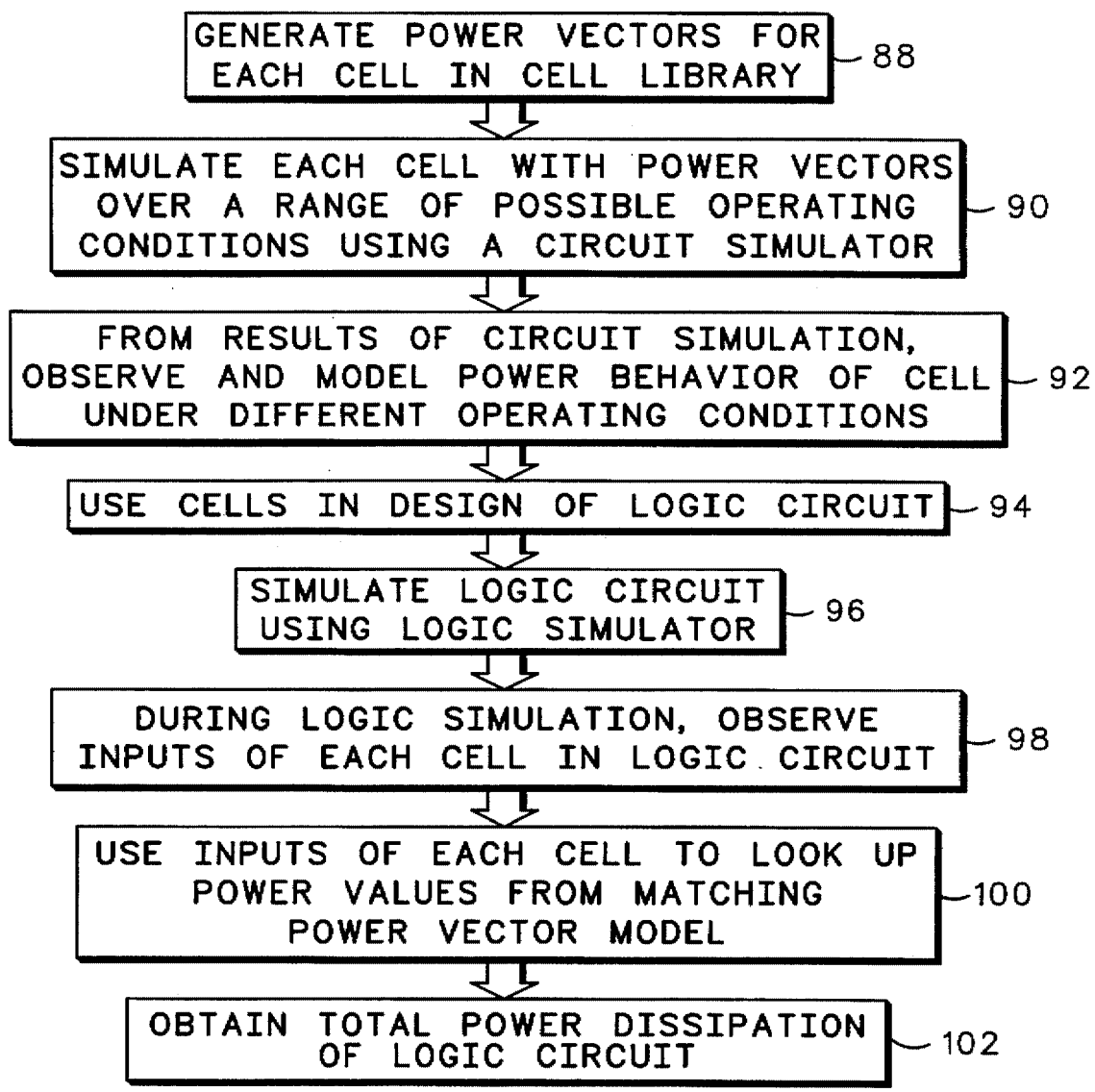
FIG. 6 illustrates steps of using power vectors in a circuit simulation in the design of an integrated circuit.

FIG. 6 illustrates the use of the power vectors generated by the method described herein for the design of an IC. Step 88 generates a minimal set of power vectors as described in steps 32–38 for each cell in the cell library. Step 90 simulates each cell with power vectors over a range of possible operating conditions using a circuit simulator. Step 92 observes the results of step 90 and models the power behavior of the cell under different operating conditions. Step 94 allows the designer to use the cell in the design of a logic circuit. Step 96 simulates the logic circuit using a logic simulator. Step 98 observes inputs of each cell in the logic circuit. Step 100 uses inputs of each cell to look up power values from the matching power vector model. Step 102 obtains total power dissipation of the logic circuit. This procedure is repeated until a circuit design is obtained that has a suitable power dissipation. Laying out the circuit based on the circuit design having the suitable power dissipation.

In particular, the set of power vectors generated with the above procedure provides important information in understanding and characterizing the dynamic and static power dissipation of a cell in a cell-based VLSI design environment. In a cell-based VLSI design environment, large designs can be constructed using a set of cells from a standard cell library. The cells from the cell library are designed and characterized apriori. The characterization allows the modeling of cell behavior under different possible operating conditions. The power vectors obtained can be used to characterize the power and timing behavior of the cells.

In power characterization, each dynamic power vector of a cell is associated with a power value representing the power dissipation of the cell under its intended operating conditions. The power dissipation under the transition described by the power vector can be accurately obtained from a detailed circuit-level simulation such as SPICE. With such power characterization, the designer can perform logic-level simulation to determine the power dissipation of a large design composed of these cells. Such logic-level power analysis has been shown to be 10,000 to 20,000 times faster than circuit-level power simulation (such as SPICE) while achieving accuracy within 15% of the circuit simulator. In addition, the use of logic-level power analysis allows the chip designer to handle large designs with up to several hundred thousand cells. Such designs are impossible to simulate using circuit-level simulation technology. The automated process of generating power vectors has made it possible to apply logic-level power analysis tools.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A method of generating power vectors for power dissipation simulation of a cell, comprising the steps of:

generating primitive power vectors that cause an output of the cell to transition by,
(a) defining a Boolean function describing logical operation of the cell,
(b) generating a Boolean difference function for each combination of output y and $x_i$ of the cell,
(c) expressing said Boolean difference function in sum-of-products notation to isolate product terms,
(d) generating first and second power vectors for each of said product terms based on said Boolean difference function,
(e) incrementing a variable $x_j$ through inputs $x_i$,
(f) assigning said variable $x_j$ of said first vector as rising when $x_j=x_i$,
(g) assigning said variable $x_j$ of said second vector as rising when $x_j=x_i$,
(h) assigning said variable $x_j$ of said first and second vectors as logic one when $x_j \neq x_i$ and said product term is uncomplemented,
(i) assigning said variable $x_j$ of said first and second vectors as logic zero when $x_j \neq x_i$ and said product term is complemented, and
(j) assigning said variable $x_j$ of said first and second vectors as don't care when $x_j \neq x_i$ of said product term is absent, generating internal power vectors that cause an internal node to transition without transitioning said output of the cell;

generating static power vectors for the cell;

providing a minimal set of power vectors from said primitive power vectors and said internal power vectors and said static power vectors;

storing the minimal set of power vectors from said primitive power vectors, said internal power vectors, and said static power vectors in a computer-readable medium;

performing a circuit simulation with said minimal set of power vectors to determine power dissipation for the cell;

implementing a layout of a circuit in accordance with the circuit simulation; and generating a set of photomasks in accordance with the layout of the circuit.

2. The method of claim 1 wherein said step of generating static power vectors includes the step of determining all possible binary combinations of inputs to the cell.

3. The method of claim 1 wherein said step of providing a minimal set of power vectors includes the steps of:

sorting said primitive power vectors and said internal power vectors and said static power vectors so that identical power vectors are adjacent;

eliminating adjacent identical power vectors; and merging logically equivalent power vectors.

4. The method of claim 1 wherein said step of generating internal power vectors includes the steps of:

defining a Boolean function describing logical operation of the cell;

generating a first Boolean difference function for each combination of internal node z and input $x_i$ of the cell;

expressing said first Boolean difference function in sum-of-products notation to isolate product terms;

generating first and second power vectors for each of said product terms based on said first Boolean difference function;

incrementing a variable $x_j$ through inputs $x_i$;

assigning said variable $x_j$ of said first vector as rising when $x_j = x_i$;

assigning said variable $x_j$ of said second vector as falling when $x_j = x_i$;

assigning said variable $x_j$ of said first and second vectors as logic one when $x_j \neq x_i$ and said product term is uncomplemented;

assigning said variable $x_j$ of said first and second vectors as logic zero when $x_j \neq x_i$ and said product term is complemented; and assigning said variable $x_j$ of said first and second vectors as don't care when $x_j \neq x_i$ and said product term is absent.

5. The method of claim 4 wherein said step of generating internal power vectors further includes the steps of:

generating a second Boolean difference function for each combination of output y, internal node z and input $x_i$ of the cell;

expressing said second Boolean difference function in sum-of-products notation to isolate product terms; and complementing said second Boolean difference function.

6. The method of claim 5 wherein said step of generating internal power vectors further includes the steps of:

generating third power vectors for each of said product terms based on said second Boolean difference function;

incrementing said variable $x_j$ through inputs $x_i$; assigning said variable $x_j$ of said first and second vectors as logic one when $x_j \neq x_i$ and said product term is uncomplemented;

assigning said variable $x_j$ of said first and second vectors as logic zero when $x_j \neq x_i$ and said product term is complemented;

assigning said variable $x_j$ of said first and second vectors as don't care when $x_j \neq x_i$ and said product term is absent;

forming a first intersection between said first power vectors and said third power vectors for providing said internal power vectors; and forming a second intersection between said second power vectors and said third power vectors for providing said internal power vectors.

7. The method of claim 1 further including the steps of:

generating internal power vectors that cause an internal node to transition without transitioning said output of the cell;

generating static power vectors for the cell by determining all possible binary combinations of inputs to the cell;

providing a minimal set of power vectors from said primitive power vectors and said internal power vectors and said static power vectors; and performing a circuit simulation with said minimal set of power vectors to determine power dissipation for the cell.

8. The method of claim 7 wherein said step of providing a minimal set of power vectors includes the steps of:

sorting said primitive power vectors and said internal power vectors and said static power vectors so that identical power vectors are adjacent;

eliminating adjacent identical power vectors; and merging logically equivalent power vectors.

9. A method of generating internal power vectors that cause an internal node to transition without propagating to an output of a cell, comprising the steps of:

generating primitive power vectors that cause an internal node to transition by, defining a Boolean function describing logical operation of the cell;

generating a first Boolean difference function for each combination of internal node z and input $x_i$ of the cell;

expressing said first Boolean difference function in sum-of-products notation to isolate product terms;

generating first and second power vectors for each of said product terms based on said first Boolean difference function;

incrementing a variable $x_j$ through inputs $x_i$;

assigning said variable $x_j$ of said first vector as rising when $x_j = x_i$;

assigning said variable $x_j$ of said second vector as falling when $x_j = x_i$;

assigning said variable $x_j$ of said first and second vectors as logic one when $x_j \neq x_i$ and said product term is uncomplemented;

assigning said variable $x_j$ of said first and second vectors as logic zero when $x_j \neq x_i$ and said product term is complemented;

assigning said variable $x_j$ of said first and second vectors as don't care when $x_j \neq x_i$ and said product term is absent;

generating static power vectors for the cell;

providing a minimal set of power vectors from said primitive power vectors and said internal power vectors and said static power vectors;

storing the minimal set of power vectors from said primitive power vectors, said internal power vectors, and said static power vectors in a computer-readable medium;

performing a circuit simulation with said minimal set of power vectors to determine power dissipation for the cell;

implementing a layout of a circuit in accordance with the circuit simulation; and generating a set of photomasks in accordance with the layout of the circuit.

10. The method of claim 9 further includes the steps of:

generating a second Boolean difference function for each combination of output y, internal node z and input $x_i$ of the cell;

expressing said second Boolean difference function in sum-of-products notation to isolate product terms; and complementing said second Boolean difference function.

11. The method of claim 10 further includes the steps of:

generating third power vectors for each of said product terms based on said second Boolean difference function;

incrementing said variable $x_j$ through inputs $x_i$;

assigning said variable $x_j$ of said first and second vectors as logic one when $x_j \neq x_i$ and said product term is uncomplemented;

assigning said variable $x_j$ of said first and second vectors as logic zero when $x_j \neq X_i$ and said product term is complemented;

assigning said variable $x_j$ of said first and second vectors as don't care when $x_j \neq x_i$ and said product term is absent;

forming a first intersection between said first power vectors and said third power vectors for providing said internal power vectors; and forming a second intersection between said second power vectors and said third power vectors for providing said internal power vectors.

12. The method of claim 9 further including the steps of:

generating primitive power vectors that cause an output of the cell to transition;

generating internal power vectors that cause an internal node to transition without transitioning said output of the cell;

generating static power vectors for the cell by determining all possible binary combinations of inputs to the cell;

providing a minimal set of power vectors from said primitive power vectors and said internal power vectors and said static power vectors; and performing a circuit simulation with said minimal set of power vectors to determine power dissipation for the cell.

13. The method of claim 12 wherein said step of generating primitive power vectors includes the steps of:

defining a Boolean function describing logical operation of the cell;

generating a Boolean difference function for each combination of output y and input $x_i$ of the cell;

expressing said Boolean difference function in sum-of-products notation to isolate product terms;

generating first and second power vectors for each of said product terms based on said Boolean difference function;

incrementing said variable $x_j$ through inputs $x_i$;

assigning said variable $x_j$ of said first vector as rising when $x_j = x_i$;

assigning said variable $x_j$ of said second vector as falling when $x_j = x_i$;

assigning said variable $x_j$ of said first and second vectors as logic one when $x_j \neq x_i$ and said product term is uncomplemented;

assigning said variable $x_j$ of said first and second vectors as logic zero when $x_j \neq x_i$ and said product term is complemented; and assigning said variable $x_j$ of said first and second vectors as don't care when $x_j \neq x_i$ and said product term is absent.

14. The method of claim 12 wherein said step of providing a minimal set of power vectors includes the steps of:

sorting said primitive power vectors and said internal power vectors and said static power vectors so that identical power vectors are adjacent;

eliminating adjacent identical power vectors; and merging logically equivalent power vectors.

* * * * *